No. 648,552. Patented May 1, 1900.
E. H. CRANE.
FISH HOOK.
(Application filed July 15, 1899.)
(No Model.)
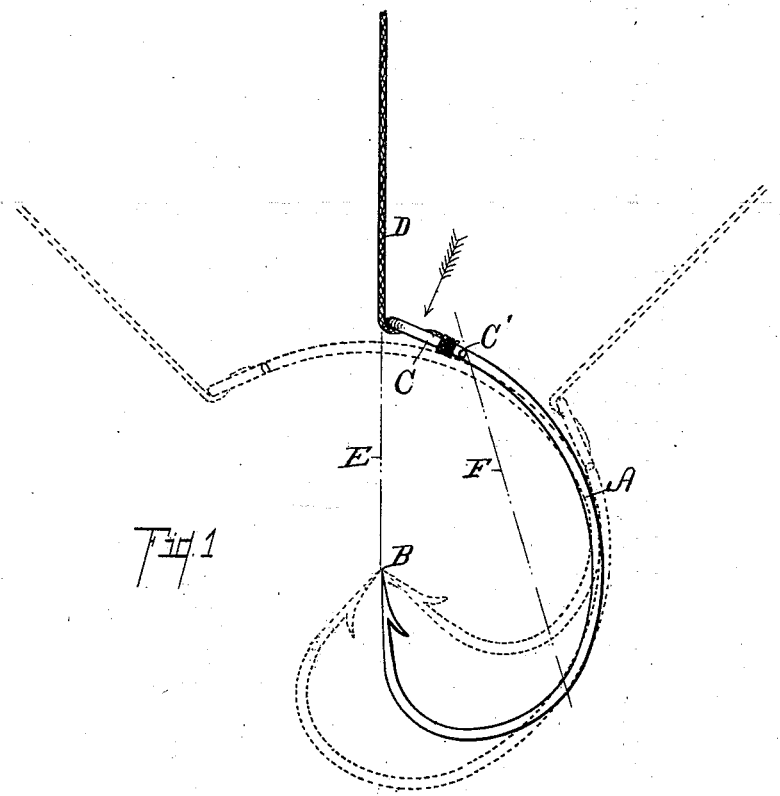
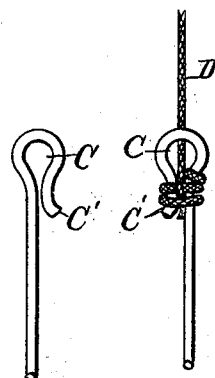
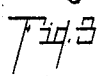
Witnesses:
Otis A. Earl
Cassa M. Chappell
Inventor,
Elliott H. Crane
By Fred L. Chappell
Att'y.

UNITED STATES PATENT OFFICE.

ELLIOTT H. CRANE, OF COLON, MICHIGAN.

FISH-HOOK.

SPECIFICATION forming part of Letters Patent No. 648,552, dated May 1, 1900.

Application filed July 15, 1899. Serial No. 723,945. (No model.)

*To all whom it may concern:*

Be it known that I, ELLIOTT H. CRANE, a citizen of the United States, residing at the city of Colon, in the county of St. Joseph and State of Michigan, have invented certain new and useful Improvements in Fish-Hooks, of which the following is a specification.

This invention relates to improvements in fish-hooks.

One object of this invention is to provide a fish-hook in which the action of the line or tension upon the snood or snell of which will carry the point straight into the fish and which is so formed that it is impossible for the jaws of the fish to engage the shank to in any way relieve the pressure or dislocate the point of the hook.

A further object is to provide an improved construction of eye or shank for the hook to which a snood or line is easily attached.

A further object is to provide an improved combination of the snood and hook which avoids the necessity of winding the parts with thread or wire to retain them together.

Further minor objects will appear in the detailed description.

I accomplish the objects of my invention by the devices and means described in this specification.

The invention is clearly defined and pointed out in the claim.

A structure embodying my invention is fully illustrated in the accompanying drawings, forming a part of this specification, in which—

Figure 1 illustrates my improved fish-hook, which is also shown in dotted positions to illustrate the action of the same. Fig. 2 illustrates the improved snood and eye. Fig. 3 is also a detail view illustrating the eye without the snood taken from the top side or in the direction of the little arrow appearing in Fig. 1.

In the drawings similar letters of reference refer to similar parts throughout the several views.

Referring to the lettered parts of the drawings, A is the hook, having a specially-constructed eye C, and D is the snood or line secured thereto. It will be observed that the direction of the barb or point of the hook is toward the eye of the same, so that a pull on the line or snood D draws the point of the hook straight into engagement and the full tension of the line is exerted in driving the point of the hook deeper in. The lower portion of the hook is in the usual form of a fish-hook. The back portion is curved in a deep abrupt curve, leaving a wide space between the point of the hook and the back at all points. The usual form of the fish-hook is indicated approximately by the line F should the point be directed exactly to the eye of the hook, and this would be of no particular advantage, because the jaws of a fish would strike the back of the hook and assist in dislocating it and afford the fish a leverage to displace the point. I have illustrated the hook in various positions by means of dotted lines illustrating a variety of positions of the hook when the line is pulled in different directions. It will be observed from this that in whatever direction the pull is upon this line the hook positively engages and that any maneuvers of a fish are utterly ineffective in displacing the point of the hook, because it is unable to secure any leverage on the shank. In whatever way the hook is struck or taken the point will become engaged and when once engaged cannot be displaced, and every pull serves to draw the hook deeper instead of tearing it out. The eye of the hook I form specially, as indicated in Figs. 2 and 3. The eye, it will be observed, is formed in a loop C at the end of the hook, which extends back in close proximity to the shank and then receives a sharp outward turn at C'. The snood or line is secured to this eye by placing the end alongside the shank of the hook and winding it about the neck formed by the outturned portion C', giving the line a half-hitch on the shank of the hook and threading the end through the eye C. This retains the snood on the hook, without the necessity of specially winding the hook and the snood together, very securely without injury to the snood and so that it is practically impossible for the snood and hook to become separated without the breaking of the one or the other.

I desire to state in this connection that my improved hook in the form I have shown it will have all of the advantages of efficiency, so far as the hook itself is concerned, no matter by what means the snood or line is attached to the same, and I also desire to remark that the particular form of eye is adapted for use with any form or style of fish-hook.

Having thus described my invention, what I claim as new, and desire to secure by Letters Patent, is—

A fish-hook formed with its point or barb directed to the eye of the same and the back thereof bent into a broad curve and widely separated from the point of the hook, whereby the point of the hook is always directed inward by any tension on the line and the fish is prevented from exerting a leverage upon the hook by striking its jaws against the back or shank, as specified.

In witness whereof I have hereunto set my hand and seal in the presence of two witnesses.

ELLIOTT H. CRANE. [L. S.]

Witnesses:
 FLOY CASTLE,
 D. L. AKEY.